United States Patent
Hirota

(10) Patent No.: US 10,166,842 B2
(45) Date of Patent: Jan. 1, 2019

(54) AIR-CONDITIONING GRILL INSTALLATION STRUCTURE AND AIR-CONDITIONING GRILL INSTALLATION METHOD

(71) Applicant: CALSONIC KANSEI CORPORATION, Saitama (JP)

(72) Inventor: Hiroyuki Hirota, Saitama (JP)

(73) Assignee: CALSONIC KANSEI CORPORATION, Saitama (JP)

( * ) Notice: Subject to any disclaimer, the term of this patent is extended or adjusted under 35 U.S.C. 154(b) by 287 days.

(21) Appl. No.: 15/305,538

(22) PCT Filed: Apr. 8, 2015

(86) PCT No.: PCT/JP2015/060957
§ 371 (c)(1),
(2) Date: Oct. 20, 2016

(87) PCT Pub. No.: WO2015/163147
PCT Pub. Date: Oct. 29, 2015

(65) Prior Publication Data
US 2017/0043648 A1 Feb. 16, 2017

(30) Foreign Application Priority Data
Apr. 25, 2014 (JP) .................. 2014-090766

(51) Int. Cl.
*F24F 13/08* (2006.01)
*B62D 25/14* (2006.01)
(Continued)

(52) U.S. Cl.
CPC ............ *B60H 1/34* (2013.01); *B60H 1/0055* (2013.01); *B62D 25/142* (2013.01); *F24F 13/084* (2013.01); *B60H 2001/3492* (2013.01)

(58) Field of Classification Search
CPC .................. B60H 1/34; B60H 1/0055; B60H 2001/3492; B62D 25/142; F24F 13/084
See application file for complete search history.

(56) References Cited

U.S. PATENT DOCUMENTS 3,648,592 A * 3/1972 Nieboer ............... B60H 1/3428
29/890.035
4,750,410 A * 6/1988 Parker ...................... B60H 1/34
454/155
(Continued)

FOREIGN PATENT DOCUMENTS

BR 0501183-3 11/2005
CN 1491167 4/2004
(Continued)

OTHER PUBLICATIONS

International Search Report dated Jul. 14, 2015 in International (PCT) Application No. PCT/JP2015/060957.

*Primary Examiner* — Paul N Dickson
*Assistant Examiner* — Timothy Wilhelm
(74) *Attorney, Agent, or Firm* — Wenderoth, Lind & Ponack, L.L.P.

(57) ABSTRACT

To provide a grill installation structure that is capable of firmly supporting an air outlet of a grill body of an air-conditioning grill to a grill installation part of an installation member even when the grill installation part of the installation member is designed to have a notched shape. A finisher of the grill installation part is formed in a notched shape such that an air-conditioning grill unit is insertable in a direction (grill insertion direction Ig) orthogonal to an opening direction of the air outlet, and the finisher includes a grill fixing part on the back. The air-conditioning grill unit includes an outer peripheral flange disposed frontward to a front surface side of the finisher, and the air-conditioning (Continued)

grill unit includes a grill holding plate that is installed in the grill fixing part from a back thereof.

14 Claims, 10 Drawing Sheets

(51) Int. Cl.
    *B60H 1/34*     (2006.01)
    *B60H 1/00*     (2006.01)

(56) References Cited

U.S. PATENT DOCUMENTS

| | | | | |
|---|---|---|---|---|
| 5,480,350 | A * | 1/1996 | Naruse | B60H 1/3421 454/155 |
| 5,482,506 | A * | 1/1996 | Tsuda | B29C 45/0017 454/155 |
| 6,209,906 | B1 * | 4/2001 | DeWitt | B60H 1/34 280/728.2 |
| 6,685,261 | B2 * | 2/2004 | Brancheriau | B60H 1/00564 296/208 |
| 6,743,089 | B2 * | 6/2004 | Driller | B60H 1/34 454/124 |
| 6,854,783 | B2 * | 2/2005 | Teranishi | B60K 37/00 296/37.12 |
| 7,036,865 | B2 * | 5/2006 | Sato | B60K 37/02 180/90 |
| 7,077,452 | B2 * | 7/2006 | Song | B60H 1/3407 180/90 |
| 10,054,332 | B2 * | 8/2018 | Suzuki | B60H 1/3421 |
| 2001/0031619 | A1 * | 10/2001 | Yabuya | B60H 1/3421 454/155 |
| 2002/0178744 | A1 * | 12/2002 | Tanabe | B60H 1/3421 62/407 |
| 2004/0072533 | A1 | 4/2004 | Cho | |
| 2004/0092225 | A1 * | 5/2004 | Gehring | B60H 1/3421 454/155 |
| 2005/0253409 | A1 | 11/2005 | Sato et al. | |
| 2008/0119124 | A1 * | 5/2008 | Okuno | B60H 1/3428 454/69 |
| 2008/0125026 | A1 * | 5/2008 | Shin | B60H 1/34 454/69 |
| 2009/0286462 | A1 * | 11/2009 | Goto | B60H 1/3428 454/155 |
| 2010/0093269 | A1 * | 4/2010 | Sakaguchi | B60H 1/3421 454/154 |
| 2013/0303071 | A1 * | 11/2013 | Seki | B60H 1/3421 454/155 |
| 2017/0113516 | A1 * | 4/2017 | Rottmann | B60H 1/34 |

FOREIGN PATENT DOCUMENTS

| | | |
|---|---|---|
| CN | 1680131 | 10/2005 |
| JP | 58-28015 | 2/1983 |
| JP | 6-12129 | 2/1994 |
| JP | 6-320942 | 11/1994 |
| JP | 7-40767 | 2/1995 |
| JP | 2000-62497 | 2/2000 |
| JP | 2001-140820 | 5/2001 |
| JP | 2005-297659 | 10/2005 |
| JP | 2010-930 | 1/2010 |

* cited by examiner

AIR-CONDITIONING GRILL INSTALLATION STRUCTURE AND AIR-CONDITIONING GRILL INSTALLATION METHOD

TECHNICAL FIELD

This invention relates to an installation structure for installing an air-conditioning grill in an installation member and an installation method for installing an air-conditioning grill in an installation member.

BACKGROUND ART

Vehicles such as cars are installed with an air-conditioning grill (ventilator grill) to blow air-conditioning air from an air conditioner to an instrument panel mounted on a front part of a vehicle cabin (see for example, Patent literatures 1 and 2).

Some instrument panels include a main body of the instrument panel and a finisher (installation member) attached to a surface on the passenger side of the instrument panel. With this instrument panel, an air outlet of the air-conditioning grill is installed in a grill installation port provided on the finisher, and the air-conditioning air provided from the air conditioner is blown to the passenger of the vehicle.

With the installation structure to install the air-conditioning grill in the finisher, it is common to install the air-conditioning grill in the grill installation port of the finisher in the opening direction of the air outlet (i.e., substantially in the vehicle longitudinal direction).

CITATION LIST

Patent Literature

Patent Literature 1: JP2001-140820 A
Patent Literature 2: JPH06-12129 U

SUMMARY

Technical Problem

Depending on a demand of design, the upper edge and the lower edge of the grill installation port on the finisher may be formed in thin rail-shapes and installation bosses may be protruded from and provided on the back of the rail-shaped portion for the air-conditioning grill so as to install the air-conditioning grill in the installation bosses. However, if the upper edge and the lower edge of the grill installation port are formed in the thin rail-shapes, the installation bosses are protruded from positions at which the installation bosses are interfered with the grill body having a cylindrical shape. That is, it is difficult to provide installation bosses for installing the air-conditioning grill.

Further, for a design purpose, the outer peripheral flange portion formed on the periphery of the air outlet of the air-conditioning grill may be installed nearer to the passenger side than the finisher surface. In this case, the cylindrical grill body of the air-conditioning grill is inserted to the grill installation port from the passenger side so as to install the air-conditioning grill in the finisher by abutting the outer peripheral flange portion to the finisher surface.

Further, an elastic spring is provided on the outer surface of the grill body of the air-conditioning grill. With this, when the air-conditioning grill is installed from the passenger side, the air outlet of the air-conditioning grill is supported on the finisher by holding the peripheral edges of the grill installation port on the finisher between the elastic spring and the outer peripheral flange portion.

Alternatively, if the grill installation port provided on the finisher is formed as a grill installation part having, for example, a notched shape (especially, if formed as a notched grill installation part with a thin rail-shaped portion provided on the upper and lower edges) for a design purpose, the peripheral portion of the air outlet on the cylindrical grill body includes a portion which is unable to be fixed to the notched grill installation part. As a result, it is difficult to firmly support the air outlet of the grill body to the finisher.

An object of this invention is, therefore, to provide a grill installation structure that is capable of firmly supporting an air outlet of a grill body of an air-conditioning grill to a grill installation part of an installation member even when the grill installation part of the installation member is designed to have a notched shape.

Solution to Problem

In order to achieve the above object, this disclosure provides an air-conditioning grill installation structure including a grill installation part provided on an installation member, an air-conditioning grill installed in the grill installation part, the air-conditioning grill including an air outlet, and a grill fixing part provided on a back of the installation member. The grill installation part of the installation member is formed in a notched shape such that the air-conditioning grill is insertable from a direction orthogonal to an opening direction of the air outlet. The air-conditioning grill is provided with an outer peripheral flange that is disposed frontward to a front surface side of the installation member, and the air-conditioning grill is provided with a grill holding plate that is installed in the grill fixing part from a back of the grill fixing part.

Advantageous Effects

With this configuration, even if the grill installation part of the installation member is formed in the notched shape for a design purpose, the air outlet of the grill body of the air-conditioning grill is firmly supported by the grill installation part of the installation member.

DESCRIPTION OF EMBODIMENT

Hereinafter, an embodiment of an installation structure for an air-conditioning grill will be described with reference to drawings.
(Configuration)

Figure 1:
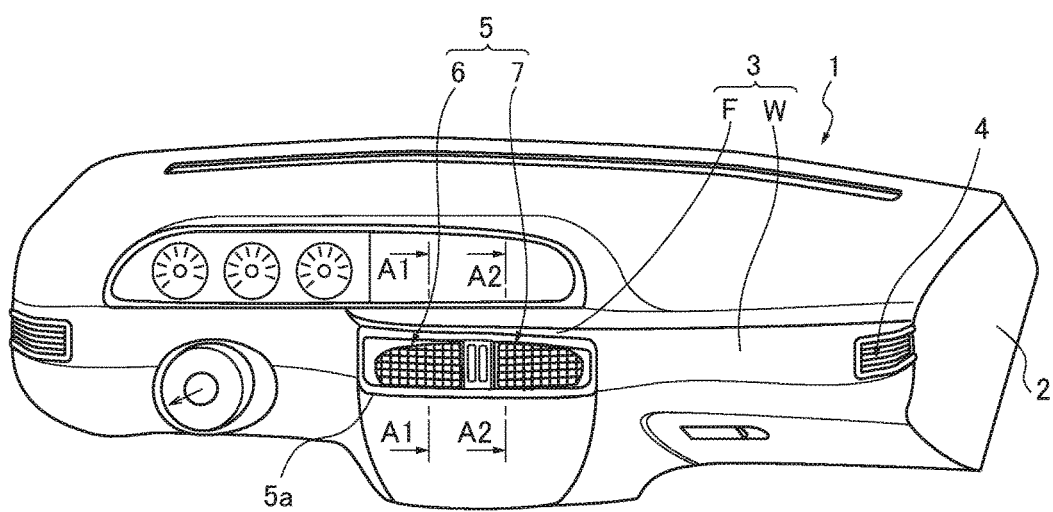
FIG. 1 is a schematic perspective view of an instrument panel having a grill installation structure according to an embodiment.

An instrument panel 1 illustrated in an overall perspective view of FIG. 1 includes an instrument panel body 2 and a finisher 3 (installation member). The finisher 3 is provided on a passenger side of the instrument panel body 2 to decorate the panel body. The finisher 3 is, along the instrument panel body 2 from the center of the vehicle width direction to the right-end side in the vehicle width direction, mounted on the outer surface (a surface on the cabin side) on the front passenger seat side of the instrument panel body 2.

Figure 2:
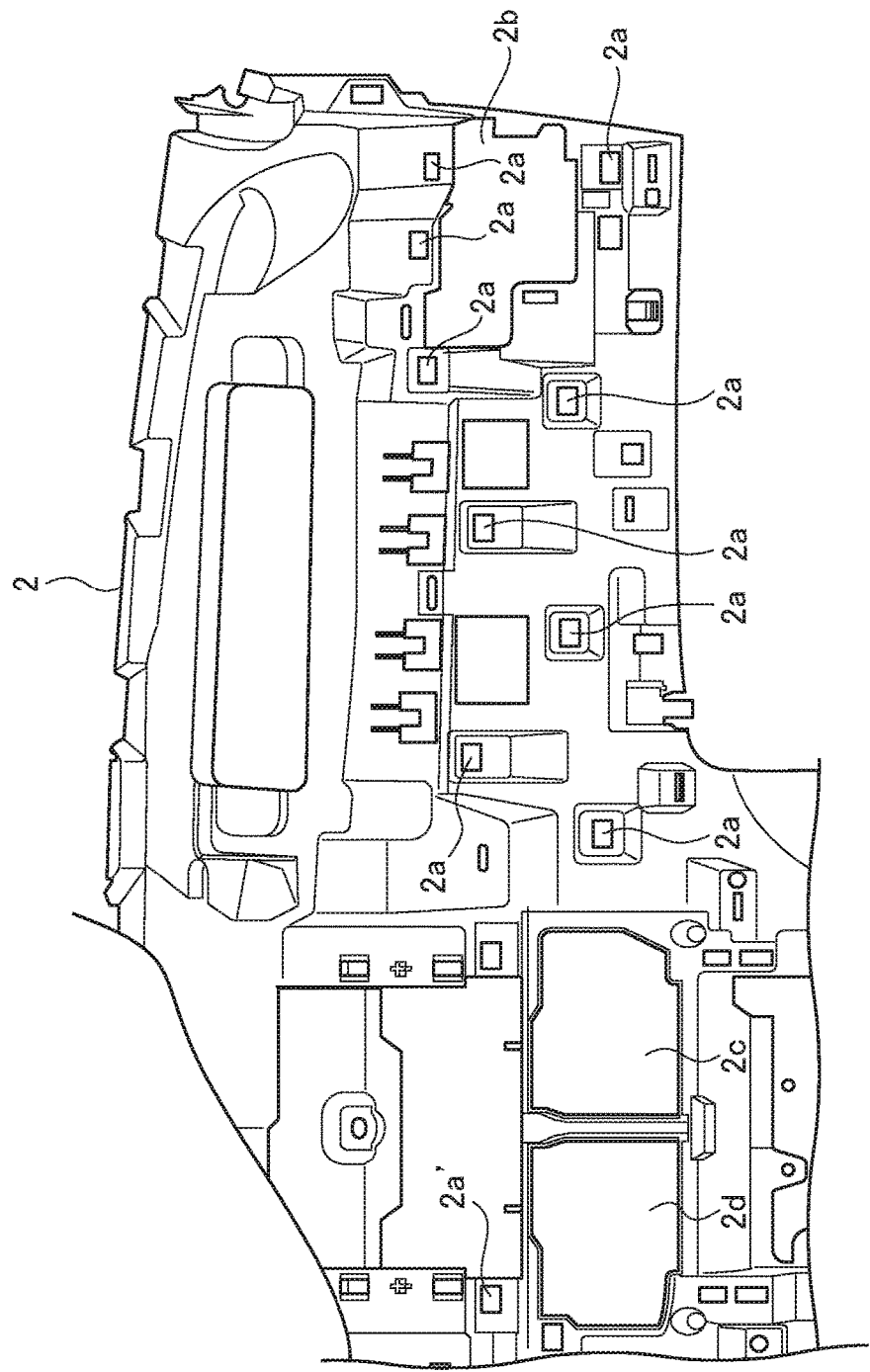
FIG. 2 is a view illustrating the instrument panel body, which is attached with a finisher, viewed from the passenger side.

As illustrated in FIG. 2, the instrument panel body 2 is provided with a plurality of claw engagement holes 2a substantially along the peripheral edge of an area for installing the finisher 3. Further, inside the area for installing the finisher 3 of the instrument panel body 2, a grill insertion port 2b is provided on the right-end part in the vehicle width direction, grill insertion ports 2c, 2d are provided at the center in the vehicle width direction, and a grill insertion hole 2a' is provided above the grill insertion port 2d.

Figure 6:
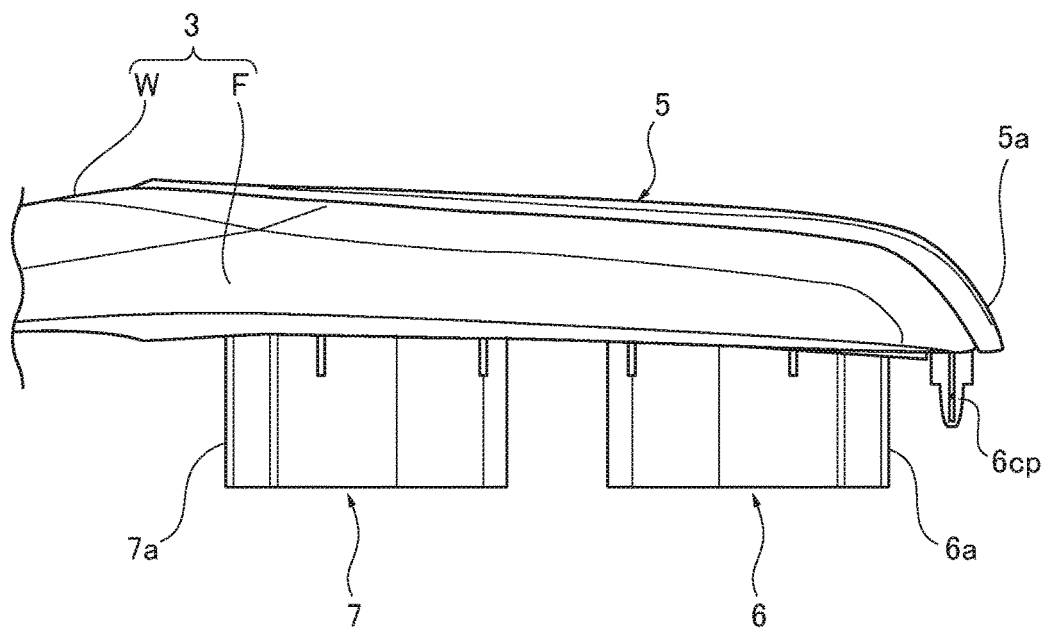
FIG. 6 is a plan view of FIG. 4.
Figure 7:
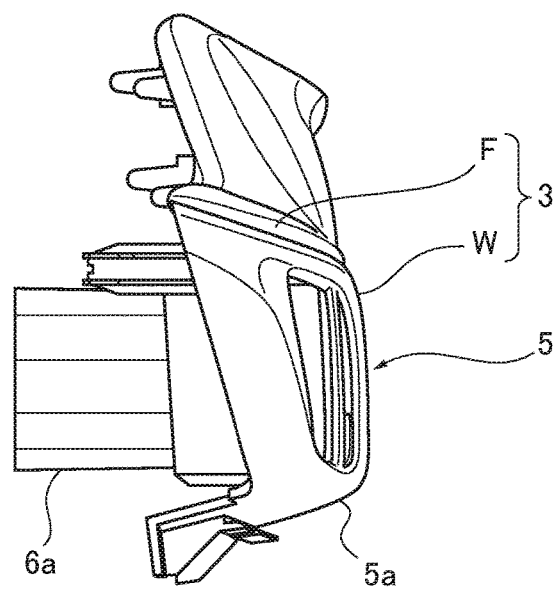
FIG. 7 is a right side view of FIG. 6.

As illustrated in FIG. 1 (see also FIGS. 6 and 7), the finisher 3 has a vertical wall W and a flange portion F. The flange portion F is provided on the upper edge of the vertical wall W. The flange portion F is formed to extend from the upper edge of the vertical wall W toward the instrument panel body 2, i.e., to extend in the forwardly obliquely upward direction. The instrument panel body 2 and the finisher 3 have complex three-dimensional (curved) shape.

Figure 3:
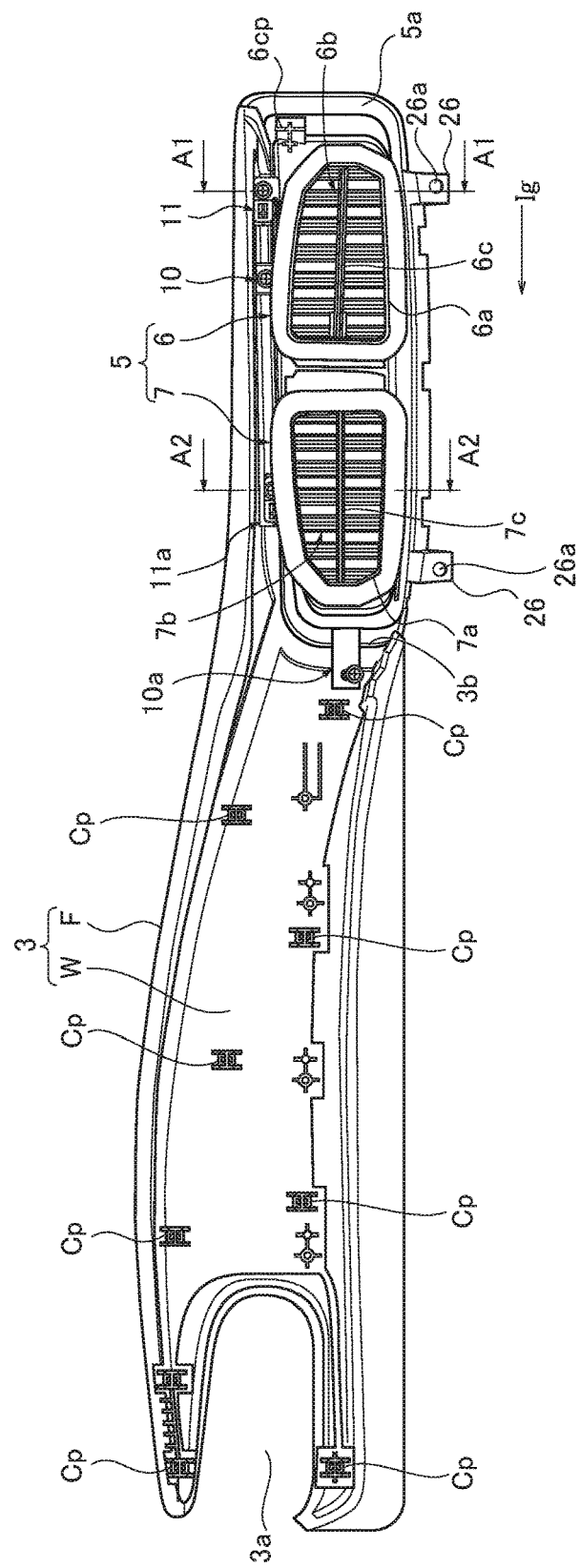
FIG. 3 is a view illustrating a back of the finisher when the air-conditioning grill unit of FIG. 1 is detached.

The back of the finisher 3 is designed as illustrated in FIG. 3. The back of the vertical wall W is provided with a plurality of engaging claws Cp. By inserting and engaging the engaging claws Cp to the plurality of claw engagement holes 2a of the instrument panel body 2, the finisher 3 is installed in the instrument panel body 2, as illustrated in FIG. 1.

It should be noted that FIG. 3 illustrates the back of the finisher 3 after laterally reversing the finisher 3. That is, the right side of the finisher 3 in FIG. 3 corresponds to the left side thereof in FIG. 1.

As illustrated in FIG. 1, an air-conditioning grill 4 (side-ventilator grill) is provided on the right-end part of the finisher 3 for the right-side passenger, while an air-conditioning grill 5 (center-ventilator grill) is provided on the left-end part of the finisher 3 for the right-side and left-side passengers.

The air-conditioning grill 5 integrally includes an air-conditioning grill 6 for the left-side passenger and an air-conditioning grill 7 for the right-side passenger. These air-conditioning grills 4, 6, and 7 are connected to un-illustrated air conditioner installed inside the instrument panel 1 and are configured to blow air-conditioning air into the vehicle cabin.

Figure 4:
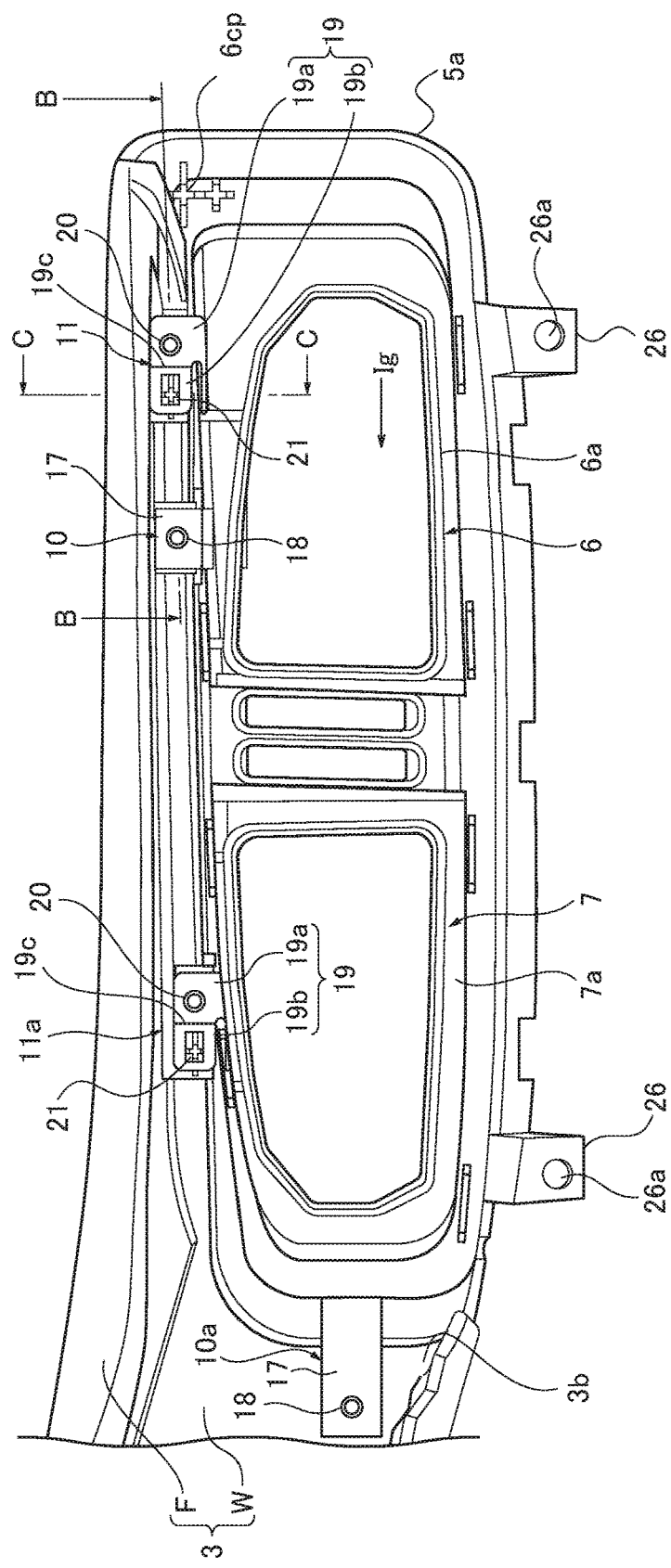
FIG. 4 is a partial enlarged view of the finisher in which a louver of the air-conditioning grill illustrated in FIG. 3 and a shut-door are both omitted and grill fixing screws of FIG. 3 are removed therefrom.
Figure 5A:
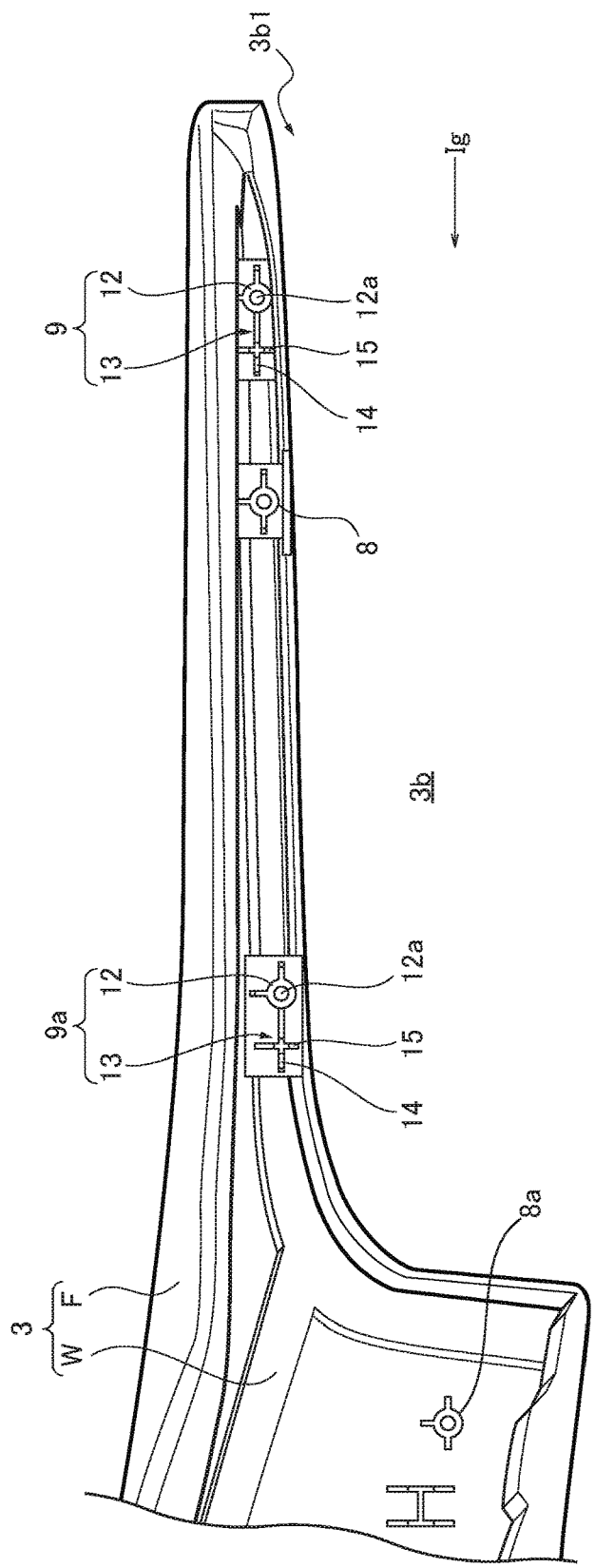
FIG. 5A is an explanation view illustrating a state in which the air-conditioning grill of FIG. 3 is detached.

In order to install the air-conditioning grills 4, 6, and 7, a notched grill installation part 3a is formed at the right-end part of the vertical wall W of the finisher 3 in FIG. 1 (i.e., the left end part in FIG. 3). That is, the grill installation part 3a is formed in a notched shape opened on the left side in FIG. 3. The left end portion of the finisher 3 (i.e., an end portion of the instrument panel 1 around the center in the vehicle width direction) illustrated in FIG. 1 is formed with a notched grill installation part 3b. The grill installation part 3b has the notched shape opened on the right side in FIG. 3 (left side in FIG. 3), as illustrated in FIGS. 4 and 5A. Both the grill installation part 3a and the grill installation part 3b are formed such that the inlet sides thereof are wider than the other sides thereof.

The grill installation part 3a is provided to correspond to the grill insertion port 2b of the instrument panel body 2. The grill installation part 3b is provided to correspond to the grill insertion ports 2c, 2d of the instrument panel body 2.

The aforementioned air-conditioning grill 6 is illustrated in FIGS. 6 to 11. To be specific, as illustrated in the cross-sectional view of FIG. 8, the air-conditioning grill 6 includes a cylindrical grill body 6a, an air outlet 6a1 provided on the passenger side of the grill body 61, a louver 6b provided at the air outlet 6a1, and a shut-door provided inside the grill body 6a.

Similarly, the air-conditioning grill 7 includes a cylindrical grill body 7a, an air outlet 7a1 provided on the passenger side of the grill body 7a, a louver 7b provided at the air outlet 7a1, and a shut-door provided inside the grill body 7a.

Further, the air-conditioning grill unit 5 integrally includes an outer peripheral flange 5a on the open-end side of the air outlets 6a1, 7a1. The outer peripheral flange 5a provides a surface decorative effect. When attached to the notched grill installation part 3b of the finisher 3, which has a complex three-dimensional shape; the outer peripheral flange 5a also has a complex three-dimensional shape so as to be installed on the outer surface of the grill installation part 3b.

Hereinafter, the installation structure for the air-conditioning grill unit 5, which includes the air-conditioning grills 6 and 7, on the finisher 3 will be described. It should be noted that the installation structure for the air-conditioning grill 4 on the finisher 3 is basically identical to the installation structures of the air-conditioning grills 6, 7. Hence, a description and drawing regarding the installation structure for the air-conditioning grill 4 on the finisher 3 are omitted.

As illustrated in FIG. 5A, the installation structure includes grill fixing parts 8, 8a and grill fixing parts 9, 9a on the back of the finisher 3 (installation member). Further, as illustrated in FIG. 4, the installation structure includes attached parts 10, 10a and attached parts 11, 11a that respectively correspond to the grill fixing parts 8, 8a and grill fixing parts 9, 9a so as to install the air-conditioning grills 6, 7.

(With respect to the grill fixing parts 8, 8a and the grill fixing parts 9, 9a of the finisher 3) As illustrated in FIG. 5A, the grill fixing parts 8, 8a are provided with bosses. The grill fixing part 8 is provided on the finisher 3. Specifically, the grill fixing part 8 is positioned on the upper edge portion of the notched grill installation part 3b. The grill fixing part 8a is provided on the finisher 3. Specifically, the grill fixing part 8a is positioned in the vicinity of an edge part, which is placed on the opposite side of the opening portion 3b1 side of the grill installation part 3b in the vehicle width direction (i.e., on the opposite side of the right side in FIG. 5A).

Figure 5B:
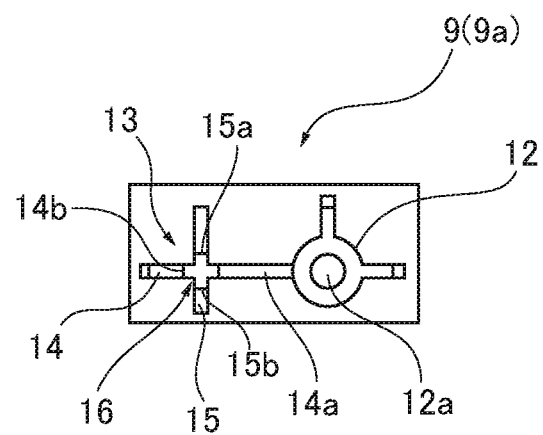
FIG. 5B is an enlarged explanation view illustrating a grill installation part of FIG. 5A.

The grill fixing parts 9, 9a are provided on the finisher 3. Specifically, the grill fixing parts 9, 9a are positioned in the vicinities of the both sides of the upper edge portion of the grill installation part 3b (i.e., on the both sides of the grill fixing part 8). As illustrated in FIGS. 5A and 5B, the grill fixing parts 9, 9a also include bosses 12 having grill installation holes 12a for installing the grill and a positioning projection 13 (positioning part) to position the air-conditioning grill 6 with respect to the finisher 3. Here, the tip of the boss of the grill fixing part 8 and the tip of the boss 12 of the grill fixing part 9 have the same height.

The air-conditioning grills 6, 7 are installed by inserting the air outlets 6a1, 7a1 (see FIG. 8) into the notched grill installation part 3b from the opening portion 3b1 illustrated in FIG. 5A to the opposite side (this represents a grill insertion direction Ig). That is, the boss 12 and the positioning projection 13 are aligned in order from the near side to the opposite side in the grill insertion direction Ig. It should be noted that the grill insertion direction Ig is substantially orthogonal to the axial directions of the cylindrical grill bodies 6a, 7a. In other words, the grill insertion direction Ig is substantially orthogonal to the axial directions of the cylindrical grill bodies 6a, 7a and is in a direction (i.e., the vehicle width direction) crossing with the air-blowing direction of the air outlets 6a1, 7a1.

Figure 10:
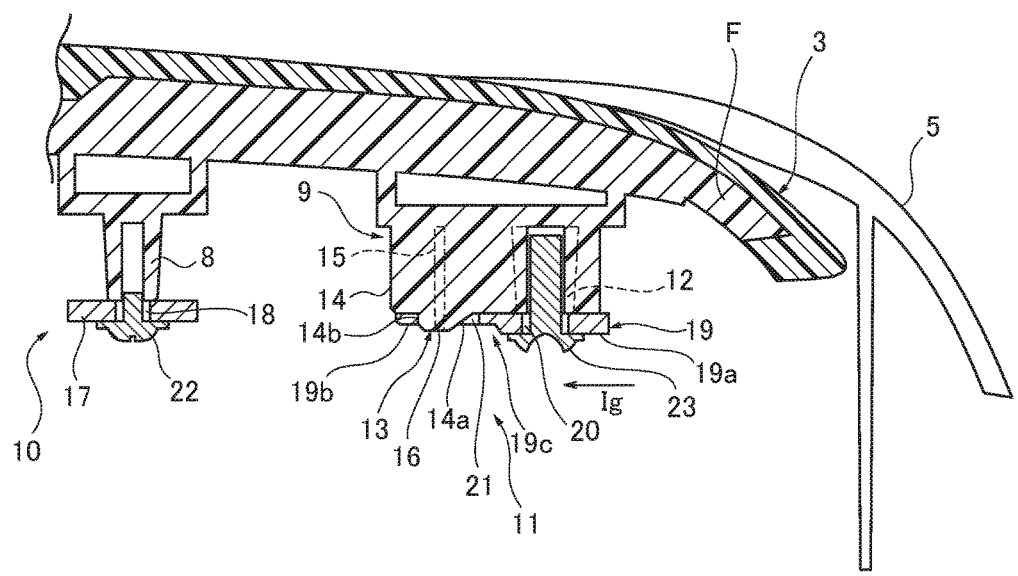
FIG. 10 is a cross-sectional view along B-B line of FIG. 4.

The aforementioned grill fixing parts 9, 9a each include a rib part that has a horizontal rib 14 and a vertical rib 15 and forms a cross shape. The horizontal rib 14 extends in the vehicle width direction and is provided integrally with the boss 12, and the vertical rib 15 extends in the vertical direction with respect to the horizontal rib 14. The cross-section 16 of the horizontal rib 14 and the vertical rib 15 is protruded more than the edge of the boss 12 (as illustrated in FIG. 10) so as to form the positioning projection 13. The portion other than the cross-section 16 is formed to be the same height as the edge of the boss 12. Note that in the description, the cross-section 16 includes not only the cross-point but also the surrounding part of the cross-point.

Figure 11:
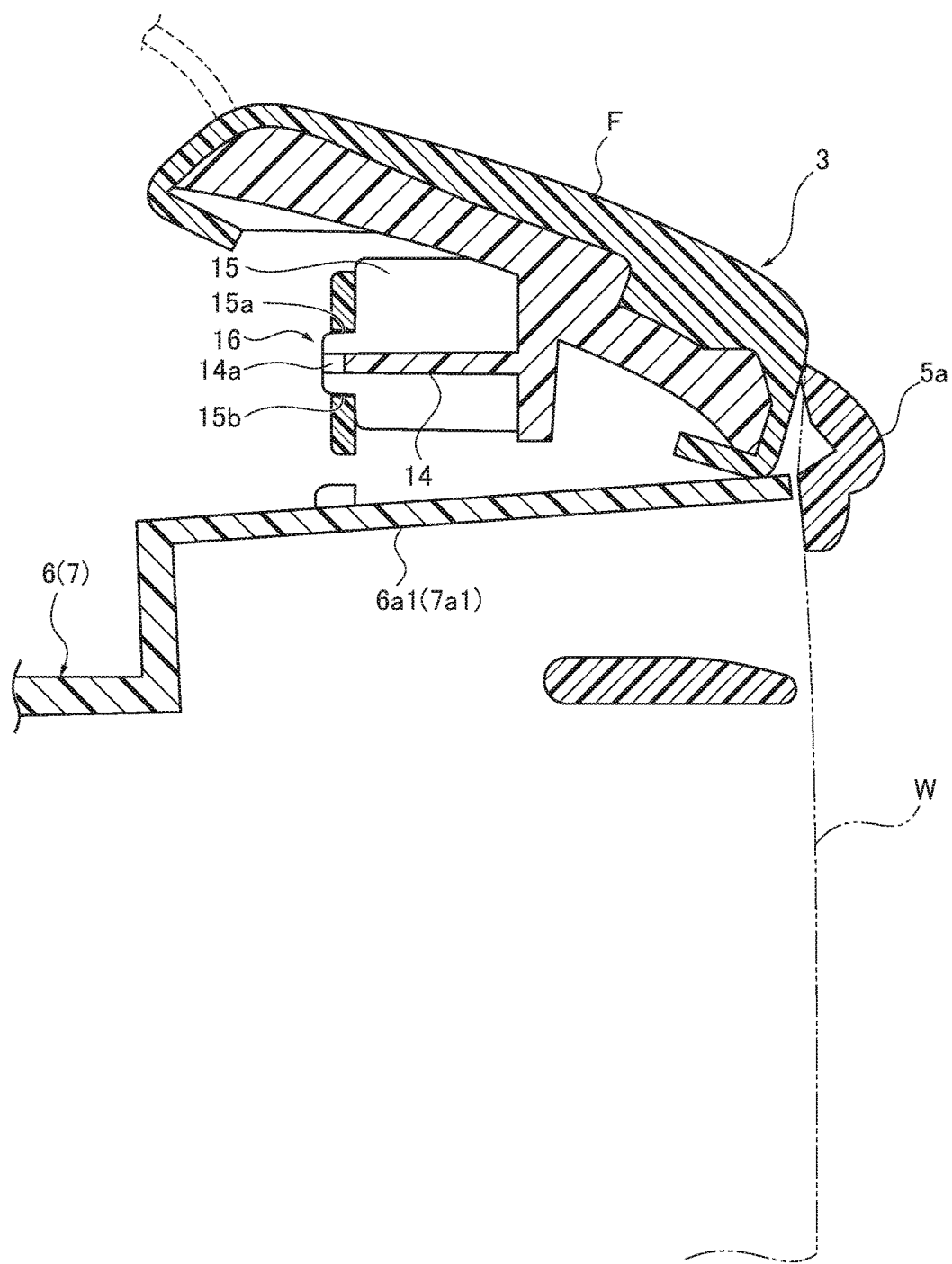
FIG. 11 is a cross-sectional view along C-C line of FIG. 4.

As illustrated in the cross-sectional view of FIG. 10, the horizontal rib 14 includes an inclined guide part 14a and a positioning step part 14b (see FIG. 5B). The inclined guide part 14a connects the boss 12 and the cross-section 16, and the positioning step part 14b is positioned opposite to the cross-section 16. As illustrated in FIGS. 5B and 11, positioning step parts 15a, 15b are formed on the vertical rib 15 so as to be provided on the both sides of the cross-section 16.

Figure 8:
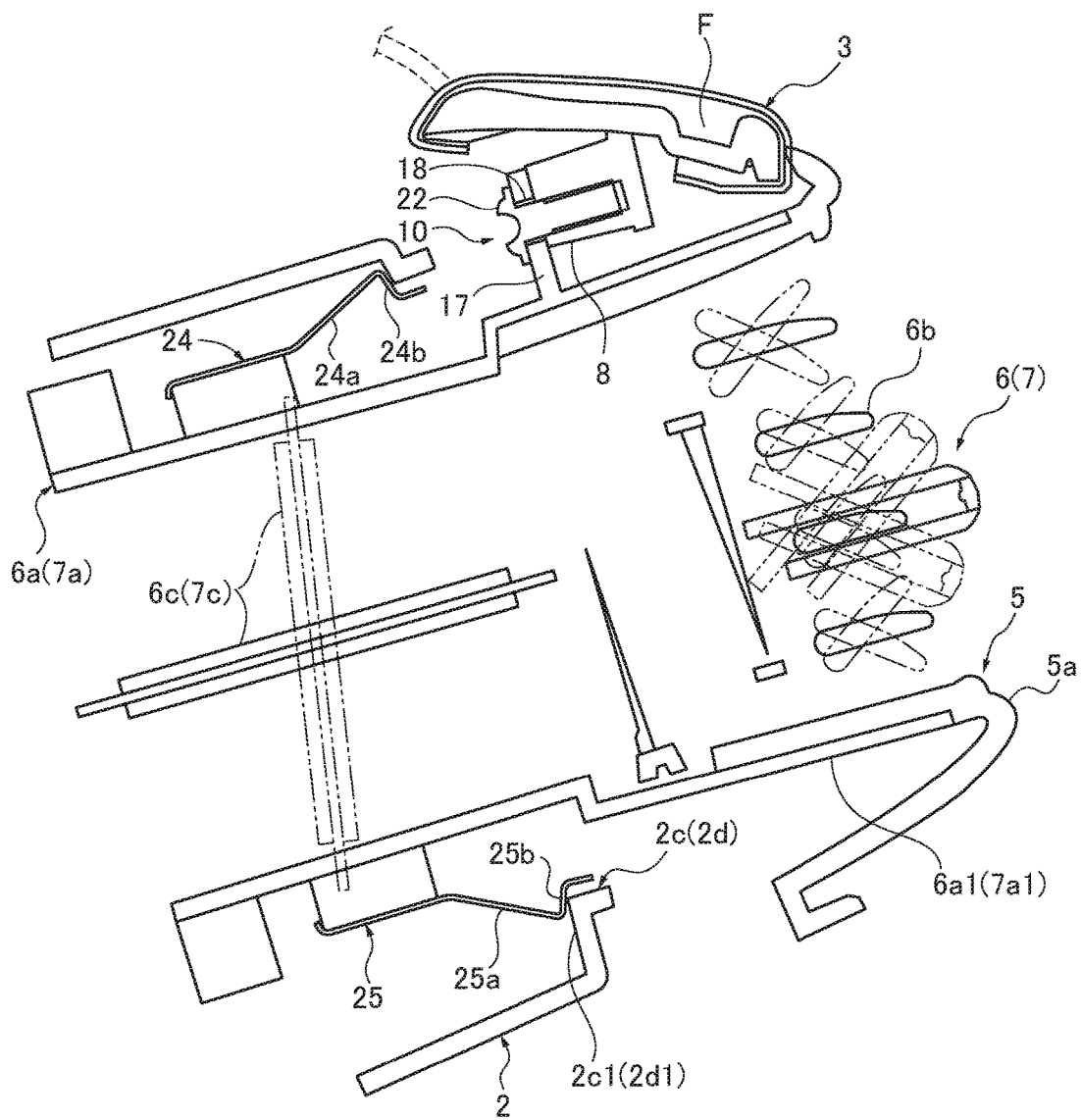
FIG. 8 is a cross-sectional view along A1-A1 line and A2-A2 line of FIGS. 1 and 3.

(With respect to the attached parts 10, 10a and the attached parts 11, 11a of the air-conditioning grills 6, 7) As illustrated in FIG. 8, the grill bodies 6a, 7a of the air-conditioning grills 6, 7 include the air outlets 6a1, 7a1. The attached parts 10, 11 shown in FIGS. 3, 4 are provided on the outer surface of the air outlet 6a1, and the attached parts 10a, 11a are provided on the outer surface of the air outlet 7a1.

The attached parts 10, 11 are correspondingly provided on the grill fixing parts 8, 9 of the finisher 3 shown in FIG. 5A, while the attached parts 10a, 11a are correspondingly provided to the grill fixing parts 8a, 9a of the finisher 3 shown in FIG. 5A.

As illustrated in FIG. 4, the attached parts 10, 10a are formed by providing through-holes 18 on protruded plates 17 (grill holding plates) respectively protruded from the outer surface of the air outlets 6a1, 7a1. Here, the louvers 6b, 7b and the shut doors 6c, 7c of the air-conditioning grills 6, 7 shown in FIG. 3 are not illustrated in FIG. 4. FIG. 4 shows a partial enlarged view of the finisher after removing the grill fixing screws shown in FIG. 3

The attached parts 11, 11a each include a grill holding plate 19. As illustrated in FIG. 4, the grill holding plates 19 are protruded from the upper edge portions of the air outlets 6a1, 7a1 shown in FIG. 8. The grill holding plates 19 each include a thick base plate 19a and a thin elastic plate 19b (see FIG. 10). The base plates 19a are respectively extended upwardly from and formed integrally with the air outlets 6a1, 7a1. The elastic plates 19b are respectively extended horizontally from the base plates 19a so as to be provided substantially in vertical. As illustrated in FIG. 4, when the grill holding plates 19 are viewed from the back of the finisher 3, the grill holding plates 19 are formed in an L-shape with the base plates 19a and the elastic plates 19b.

As described above, the direction to insert the air-conditioning grills 6, 7 into the grill installation part 3b is defined as the grill insertion direction Ig. The elastic plates 19b are respectively protruded from the base plates 19a in the same direction as the grill insertion direction Ig. Further, the base plates 19a are provided with through-holes 20 that correspond to the grill installation holes 12a of the bosses 12, and the elastic plates 19b are provided with a rectangular-shaped locate hole 21 to accommodate the cross-section 16 of the horizontal rib 14 and the vertical rib 15.

Accordingly, when the air outlets 6a1, 7a1 of the air-conditioning grills 6, 7 are inserted into the grill installation part 3b from the opening portion, the elastic plates 19b are deformed and guided by the corresponding inclined guide parts 14a of the positioning projections 13 on the finisher 3. As a result, the air outlets 6a1, 7a1 are moved along the grill insertion direction Ig.

Along with this movement, the locate holes 21 of the elastic plates 19b face the corresponding cross-sections 16 of the positioning projections 13. Accordingly, the elastic plates 19b move back to the original shapes by their own elastic forces, thereby the cross-sections 16 are engaged with the corresponding locate holes 21 as illustrated in FIGS. 4, 10, 11. Then, the edges of the locate holes 21 in the vehicle width direction are abutted to the corresponding positioning step parts 14b as illustrated in FIG. 10. Further, the edges of the locate holes 21 in the vertical direction are adjusted to closely fit to the corresponding positioning step parts 15a, 15b. Consequently, the through-holes 20 are fitted with the corresponding bosses 12 on the finisher 3 as illustrated in FIG. 4. Here, the through-holes 18, 18 of the attached parts 10, 10a provided on the air-conditioning grills 6, 7 are fitted to the corresponding bosses of the grill fixing parts 8, 8a.

With this condition, the grill fixing screws 22 are inserted to the through-holes 18 as illustrated in FIGS. 8 and 10. The grill fixing screws 22 are then screwed in the bosses of the grill fixing parts 8 (8a) on the finisher 3 from the back. Further, as illustrated in FIG. 10, the grill fixing screws 23 are inserted to the corresponding through-holes 20 and screwed in the bosses 12 of the grill fixing parts 9 (9a) on the finisher 3 from the back. Accordingly, the air outlets 6a1, 7a1 of the air-conditioning grills 6, 7 are installed in the grill installation part 3b of the finisher 3.

The grill bodies 6a, 7a of the air-conditioning grills 6, 7 installed in the finisher 3 are then inserted into the grill insertion ports 2c, 2d of the instrument panel body 2 and then connected to un-illustrated air conditioner. Here, as illustrated in FIG. 8, the outer peripheral surfaces of the grill bodies 6a, 7a are provided with elastic holding plates 24, 25. When the grill bodies 6a, 7a are inserted into the grill insertion ports 2c, 2d, inclined plates 24a, 25a of the elastic holding plates 24, 25 are elastically deformed by the grill insertion ports 2c, 2d.

When the engaging claws Cp provided on the finisher 3 are engaged with the claw engagement holes 2a on the instrument panel body 2, the inclined plates 24a, 25a of the elastic holding plates 24, 25 on the grill bodies 6a, 7a are moved back to their original shapes by their own elastic forces. Accordingly, engaging step parts 24b, 25b provided at free ends of the elastic holding plates 24, 25 are engaged with the engagement step parts 2c1, 2d1 (see FIG. 8)

provided on the grill insertion ports 2*c*, 2*d* of the instrument panel body 2. As a result, the finisher 3 is fixed to the instrument panel body 2.

Figure 9:
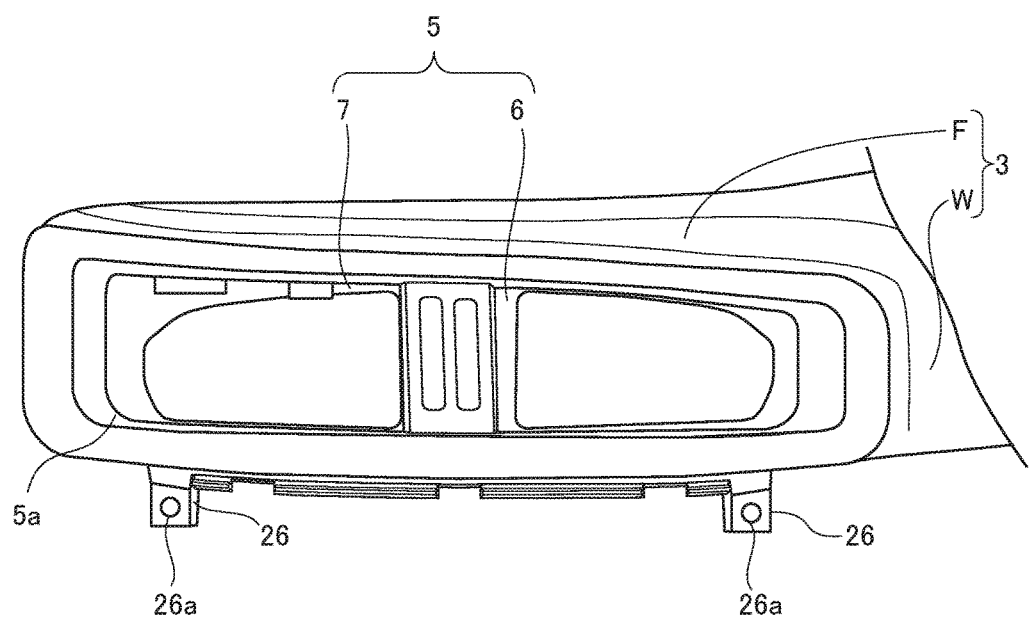
FIG. 9 is a right side view of FIG. 7.

Further, the air-conditioning grill 6 is provided with a grill fitting claw 6*cp* (grill fixing means). The grill fitting claw 6*cp* is engaged with and held by the grill fitted hole 2*a'*. Additionally, the bottom edge portion of the outer peripheral flange 5*a* of the air-conditioning grills 6, 7 is provided with a pair of installation plates 26, 26 as illustrated in FIG. 9. The installation plates 26, 26 have screw insertion holes 26*a*, 26*a*. Fixing screws (not illustrated) are inserted into the screw insertion holes 26*a*, 26*a* from the vehicle rear side and are screwed to the instrument panel body 2. With this, the bottom edge portion of the outer peripheral flange 5*a* of the air-conditioning grills 6, 7 are fixed to the instrument panel body 2.

Consequently, the outer peripheral flange 5*a* of the air-conditioning grills 6, 7 is fixed to the instrument panel body 2 by means of the grill fitting claw 6*cp* and the fixing screws (not illustrated) (i.e., by the grill fixing means). Therefore, even though a fixing part for the instrument panel body 2 is not able to be provided at the position corresponding to the notched grill installation part 3*b*, the notched grill installation part 3*b* on the finisher 3 is fixed to the instrument panel body 2 through the air-conditioning grills 6, 7.

Hereinafter, the operations and effects of the aforementioned grill installation structure will be described. (1) The grill installation structure according to the embodiment includes an installation member (finisher 3) and a grill installation part 3*b* provided on the installation member, and an air outlet (6*a*1, 7*a*1) of an air-conditioning grill (6, 7) is installed in the grill installation part 3*b*. Besides, the grill installation part 3*b* provided on the installation member (finisher 3) has a notched shape such that the air outlet (6*a*1, 7*a*1) of the air-conditioning grill (6, 7) is insertable from a direction orthogonal to the opening direction of the air outlet (6*a*1, 7*a*1). The back of the installation member (finisher 3) is provided with a positioning projection 13 and an installation hole (grill installation hole 12*a*). The air-conditioning grill (6, 7) includes a locate hole 21 and a grill holding plate 19 (see FIG. 4). The locate hole 21 is engaged with the positioning projection 13 and positions the air-conditioning grill. The grill holding plate 19 includes a through-hole 20 for fixing means (grill fixing screw 23) that is fixed to the fitting hole (grill installation hole 12*a*). The grill holding plate 19 includes at least a hinge section 19*c* between the through-hole 20 and the locate hole 21. The hinge section 19*c* is partially and elastically deformed by the positioning projection 13 when the air outlet (6*a*1, 7*a*1) is inserted to the grill installation part 3*b* from the direction orthogonal to the opening direction of the air outlet (6*a*1, 7*a*1).

Here, the grill holding plate 19 may be formed with a thick base plate 19*a* and a thin elastic plate 19*b* that are connected to each other by the hinge section 19*c*. Alternatively, the grill holding plate 19 may include a partitioning groove to divide the part having a locate hole 21 and the part having the insertion hole 20. As the part of the partitioning groove becomes thinner in the grill holding plate 19, this thinner part may be utilized as the hinge section 19*c*.

With this configuration, even if the grill installation part 3*b* of the installation member (finisher 3) is formed in a notched shape (especially, in a notched shape that only has an upper edge) for a design purpose, the air outlets (6*a*1, 7*a*1) of the grill bodies (6*a*, 7*a*) in the air-conditioning grills (6, 7) are firmly supported by the installation member (finisher 3).

To be specific, when the air-conditioning grills (6, 7) are installed in the installation member (finisher 3), the air-conditioning grills (6, 7) are inserted into the grill installation part 3*b* of the installation member (finisher 3) in the direction orthogonal to the opening direction of the air outlets (6*a*1, 7*a*1). The elastic plates 19*b* are then deformed against their elastic forces by the positioning projections 13. When the locate holes 21 and the positioning projections 13 are engaged, the elastic plates 19*b* return to their original shapes by their elastic forces.

Accordingly, the air-conditioning grills (6, 7) are positioned with respect to the installation member (finisher 3) by engaging the positioning projection 13 with the locate holes 21 of the elastic plates 19*b*. Further, the air-conditioning grills (6, 7), both of which have the complex three-dimensional shapes, are engaged with the grill installation part 3*b* of the installation member (finisher 3) such that the installation member (finisher 3) is positioned and held between the outer peripheral flange 5*a* on the air-conditioning grills (6, 7) and the grill holding plates 19. With this, the air-conditioning grills (6, 7) are temporarily held by the installation member (finisher 3). Additionally, the grill installation part 3*b* may be formed such that the inlet side thereof is (slightly) wider than the other side. That is, the air-conditioning grills (6, 7) and the installation member (finisher 3) are fitted and wedged to each other, resulting in strengthening the binding force. Sequentially, the installation member (the grill fixing screw 23) is inserted into the insertion hole 20 of the grill holding plate 19 from the back, and the installation member (the grill fixing screw 23) is then screwed to the installation hole (the grill installation hole 12*a*) of the grill fixing part 9 (9*a*). As a result, the air outlets (6*a*1, 7*a*1) of the air-conditioning grills (6, 7) are installed in the grill installation part 3*b* of the installation member (finisher 3).

As described above, the positioning projection 13 of the installation member (finisher 3) are engaged with (fitted to) the insertion holes 20 of the grill holding plates 19 when the air-conditioning grills (6, 7) are installed in the installation member (finisher 3). Accordingly, the installation member (finisher 3) is held (sandwiched) between the grill holding plates 19 and the outer peripheral flange 5*a*. Therefore, the air outlets (6*a*1, 7*a*1) of the air-conditioning grills (6, 7) are temporarily held by the installation member (finisher 3) using the grill holding plates 19 and the outer peripheral flange 5*a* easily and quickly.

The installation member (the grill fixing screw 23) is then inserted into the insertion holes 20 of the grill holding plates 19 and fixed (screwed) to the installation hole (the grill installation hole 12*a*). With this, the air outlets (6*a*1, 7*a*1) of the air-conditioning grills (6, 7) are firmly supported by the installation member (finisher 3 (specifically, the grill installation part 3*b*)).

(2) Further, in the air-conditioning grill installation structure according to the embodiment, the grill holding plates 19 include a thick base plate 19*a* and a thin elastic plate 19*b*. The thick base plate 19*a* is integrally provided on the outer surface of the air outlet (6*a*1, 7*a*1) of the corresponding air-conditioning grill (6, 7). The thin elastic plate 19*b* is extended from the corresponding base plate 19*a* in the insertion direction of the grill installation part 3*b*. The base plate 19*a* has the insertion hole 20, and the elastic plate 19*b* has the locate hole 21. The hinge section 19*c* is provided at a connection part of the elastic plate 19*b* and the base plate 19*a*.

With this configuration, the portion from the connection part to the edge of the elastic plate 19*b* is easily deformed or bent by the hinge section 19c. Therefore, when the air-conditioning grills (6, 7) are inserted into the grill installation part 3b in the grill insertion direction Ig, the whole elastic plate 19b of the grill holding plate 19 is elastically deformed by the positioning projection 13. Further, when the locate hole 21 is fitted to the corresponding positioning projection 13, the elastic plate 19b returns to be flat by its own elastic force and the locate hole 21 of the elastic plate 19b is easily engaged with the positioning projection 13.

(3) Further, in the air-conditioning grill installation structure according to the embodiment, the installation member is the finisher 3 attached to the instrument panel body 2.

With this configuration, the air-conditioning grills (6, 7) are easily installed in the instrument panel body 2 with the finisher 3.

(4) Further, in the air-conditioning grill installation structure according to the embodiment, the finisher 3 includes the vertical wall W and the flange portion F. The flange portion F is provided on the upper edge portion of the vertical wall W and extended toward the instrument panel body 2. The grill installation part 3b is formed by partially cutting off the vertical wall W except the flange portion F.

With this configuration, it is possible to decrease the dimension of the finisher 3 in the vertical direction up to almost the same height as the dimension of the air-conditioning grills (6, 7) in the vertical direction. Hence, the freedom of the design of the finisher 3 is increased such that it becomes possible to freely design the finisher 3 in accordance with the shapes and the like of the air-conditioning grills (6, 7). Further, even if it is unable to hold the flange portion F of the finisher 3 between the outer peripheral flange 5a of the air-conditioning grills (6, 7) and the elastic holding plates 24, 25; it is possible to install the air-conditioning grills (6, 7) in the finisher 3.

(5) Further, in the air-conditioning grill installation structure according to the embodiment, the finisher 3 is attached to the instrument panel body 2 with the engaging claws Cp, and the air-conditioning grills (6, 7) are installed in the instrument panel body 2 at the position corresponding to the grill installation part 3b with the grill fixing means (e.g., the grill fitting claw 6cp, the fixing screws (not illustrated)).

With this configuration, the finisher 3 fixing the air-conditioning grills (6, 7) is attached to the instrument panel body 2 with the engaging claws Cp provided on the finisher 3 even though the grill installation part 3b has a notched shape. Further, the air-conditioning grills (6, 7) are installed in the instrument panel body 2 at the position corresponding to the grill installation part 3b with the grill fixing means (e.g., the grill fitting claw 6cp, the fixing screws). Accordingly, the finisher 3 and the air-conditioning grills (6, 7) are securely and firmly fixed to the instrument panel body 2.

REFERENCE SIGNS LIST

1 Instrument Panel, 3 Finisher (Installation means), 3b Grill Installation Part, 5 Air-Conditioning Grill Unit, 5a Outer Peripheral Flange, 6 Air-Conditioning Grill, 6a Grill Body, 6a1 Air Outlet, 6cp Grill Fitting Claw (Grill Fixing means), 7 Air-Conditioning Grill, 7a Grill Body, 7a1 Air Outlet, 8 Grill Fixing Part, 8a Grill Fixing Part, 9 Grill Fixing Part, 10 Attached Part, 10a Attached Part, 11 Attached Part, 11a Attached Part, 12a Grill Installation Hole, 13 Positioning Projection, 19 Grill Holding Plate, 19a Base Plate, 19b Elastic Plate, 19c Hinge, 20 Insertion Hole, 21 Locate Hole, 22 Grill Fixing Screw (Fixing means), 23 Grill Fixing Screw (Fixing means), Ig Grill Insertion Direction, Cp Engaging Claw, F Flange Portion, W Vertical Wall

CROSS-REFERENCE TO RELATED APPLICATION

This present application is based on and claims priority from Japanese Patent Application No. 2014-90766 field on Apr. 25, 2014, the disclosure of which is hereby incorporated by reference in its entirety.

The invention claimed is:

1. An air-conditioning grill installation structure, comprising:
a grill installation part provided on an installation member;
an air-conditioning grill installed in the grill installation part, the air-conditioning grill including an air outlet; and
a grill fixing part provided on a back of the installation member, wherein
the grill installation part of the installation member is formed in a notched shape such that the air-conditioning grill is insertable from a direction orthogonal to an opening direction of the air outlet,
the air-conditioning grill is provided with an outer peripheral flange that is integrally formed and disposed frontward to a front surface side of the installation member, the outer peripheral flange being configured to provide a surface decorative effect,
the air-conditioning grill is integrally provided with a grill holding plate that is attached to the grill fixing part from a back of the grill fixing part, the grill holding plate being provided on a back side of the outer peripheral flange, and
the grill installation part is positioned between the outer peripheral flange and the grill holding plate.

2. The structure according to claim 1, wherein
the grill fixing part includes a positioning projection and an installation hole,
the grill holding plate includes a locate hole and an insertion hole, the locate hole being configured to position and hold the grill holding plate by engaging with the positioning projection and the insertion hole being fixed to the installation hole as fixing means,
the grill holding plate includes a hinge section at least between the insertion hole and the locate hole, and
the hinge section is partially and elastically deformed by the positioning projection when the air-conditioning grill is inserted into the grill installation part from the direction orthogonal to the opening direction of the air outlet.

3. The structure according to claim 1, wherein the installation member is a finisher that is installed in an instrument panel body.

4. The structure according to claim 3, wherein
the finisher includes a vertical wall and a flange portion that is provided on an upper edge of the vertical wall and is extended toward the instrument panel body, and
the installation part is formed by partially cutting off the vertical wall except the flange portion.

5. The structure according to claim 4, wherein
the finisher is attached to the instrument panel body by an engaging claw, and
the air-conditioning grill is installed in the instrument panel body by grill fixing means at a position corresponding to the grill installation part.

6. The structure according to claim 2, wherein
the grill holding plate includes a thick base plate and a thin elastic plate, the base plate being provided on an outer surface of the air outlet of the air-conditioning grill and the elastic plate being extended from the base plate in the insertion direction of the air-conditioning grill to the grill installation part,
the elastic plate includes the locate hole, and
the hinge section is provided at a connection part of the elastic plate and the base plate.

7. The structure according to claim 2, wherein the installation member is a finisher that is installed in an instrument panel body.

8. The structure according to claim 7, wherein
the finisher includes a vertical wall and a flange portion that is provided on an upper edge of the vertical wall and is extended toward the instrument panel body, and
the installation part is formed by partially cutting off the vertical wall except the flange portion.

9. The structure according to claim 8, wherein
the finisher is attached to the instrument panel body by an engaging claw, and
the air-conditioning grill is installed in the instrument panel body by grill fixing means at a position corresponding to the grill installation part.

10. The structure according to claim 6, wherein the installation member is a finisher that is installed in an instrument panel body.

11. The structure according to claim 10, wherein
the finisher includes a vertical wall and a flange portion that is provided on an upper edge of the vertical wall and is extended toward the instrument panel body, and
the installation part is formed by partially cutting off the vertical wall except the flange portion.

12. The structure according to claim 11, wherein
the finisher is attached to the instrument panel body by an engaging claw, and
the air-conditioning grill is installed in the instrument panel body by grill fixing means at a position corresponding to the grill installation part.

13. An air-conditioning grill installation method, the air-conditioning grill including an air outlet at a grill installation part provided on an installation member and the grill installation part being formed in a notched shape, the method comprising:
inserting the air-conditioning grill into the notched grill installation part in a direction orthogonal to an opening direction of the air outlet,
providing the air-conditioning grill such that the installation member is positioned between an outer peripheral flange integrally provided with the air-conditioning grill and a grill holding plate integrally provided with the air-conditioning grill on a back side of the outer peripheral flange, and
installing the grill holding plate of the air-conditioning grill, from a back of the grill fixing part, in a grill fixing part provided on a back of the installation member.

14. The method according to claim 13, the grill installation part being formed in a notched shape, further comprises:
forming the grill fixing part at a position associated with a peripheral edge of the grill installation part;
sliding the air-conditioning grill into the grill installation part along the peripheral edge of the grill installation part such that the air-conditioning grill is inserted to the grill installation part.

* * * * *